United States Patent [19]

Brand et al.

[11] 4,401,066

[45] Aug. 30, 1983

[54] IGNITION DISTRIBUTOR FOR INTERNAL COMBUSTION ENGINES

[75] Inventors: Günter Brand; Richard Gerber; Karl Ehrmann, all of Stuttgart; Reinhold Kaufmann, Oberriexingen; Harald Kalippke, Benningen, all of Fed. Rep. of Germany

[73] Assignee: Robert Bosch GmbH, Stuttgart, Fed. Rep. of Germany

[21] Appl. No.: 214,745

[22] Filed: Dec. 9, 1980

[30] Foreign Application Priority Data

Feb. 20, 1980 [DE] Fed. Rep. of Germany ....... 3006257

[51] Int. Cl.³ .............................................. F02P 1/00
[52] U.S. Cl. .............................. 123/146.5 A; 123/617
[58] Field of Search .......................... 123/146.5 A, 617

[56] References Cited

U.S. PATENT DOCUMENTS

| | | | |
|---|---|---|---|
| 3,322,107 | 5/1967 | Mieras | 123/617 |
| 4,129,107 | 12/1978 | Boyer | 123/146.5 A |
| 4,224,917 | 9/1980 | Nakazawa | 123/146.5 A |
| 4,307,698 | 12/1981 | Yoshinari | 123/146.5 A |
| 4,315,493 | 2/1982 | Onishi | 123/146.5 A |

Primary Examiner—Ronald B. Cox
Attorney, Agent, or Firm—Frishauf, Holtz, Goodman & Woodward

[57] ABSTRACT

The control generator of an ignition distributor for a transistor-coil ignition comprises an annular coil (55), a rotor (54) and a stator, which is a riveted unit comprising a stator plate (18), a permanent magnet (17) and a pole disc (56). The rotor and the pole disc are molded elements of sintered iron or of a mixture of sintered iron powder and carbonyl iron powder having a binder of thermosetting resin. The rotor and the pole disc have cooperating pole teeth (59,51), which are directed parallel to the axis (60) and whose cross section is triangular, with the triangular tips oriented toward one another. These "pointed teeth" produce a more steeply inclined signal course, as a result of which a decreased inherent shifting of the inductive transducer, and thereby more reliable starting of the engine, are attained.

3 Claims, 5 Drawing Figures

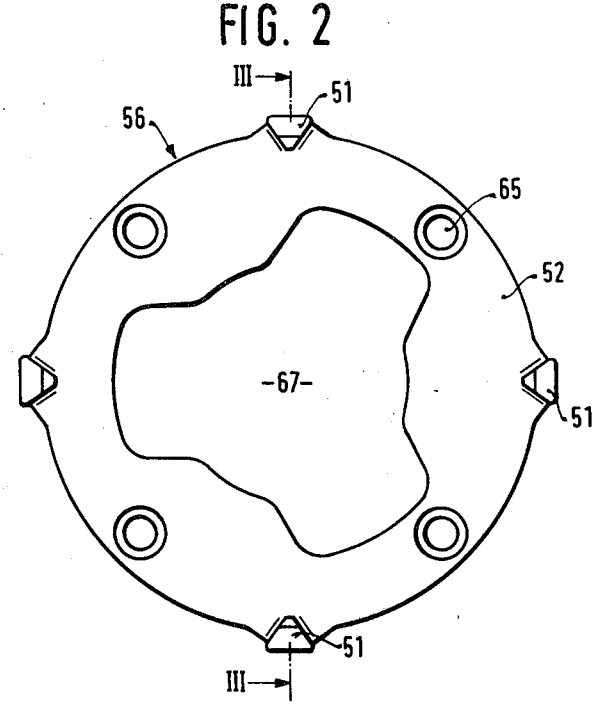
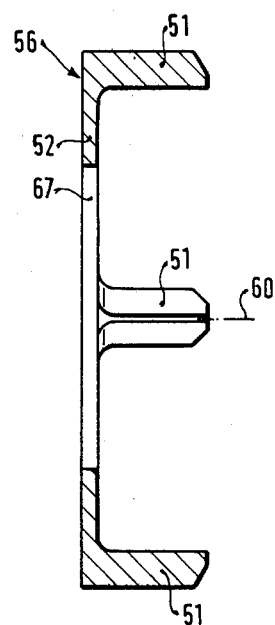
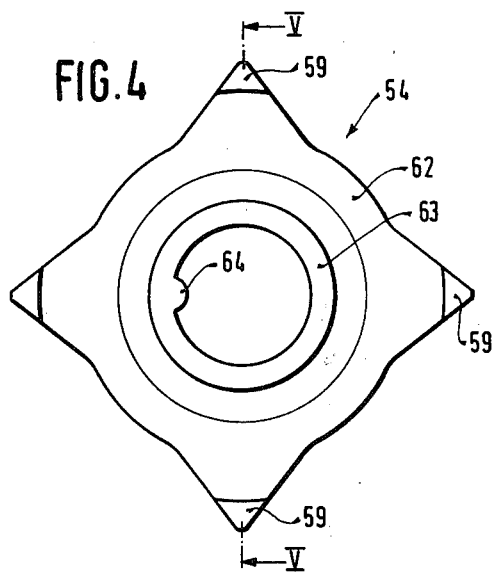
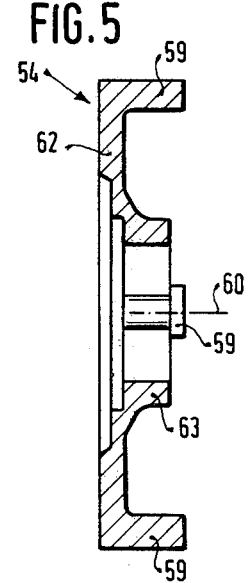

IGNITION DISTRIBUTOR FOR INTERNAL COMBUSTION ENGINES

STATE OF THE ART

The invention is based on an ignition distributor for internal combustion engines of the general type having a control generator comprising an annular coil, a rotor with axially directed pole teeth and a stator having a permanent magnet and a pole disc having axially directed pole teeth that partly overlap the rotor teeth.

In transistor-coil ignition systems having inductive transducers and positive triggering, there is a relatively large amount of inherent mis-timing, which causes reaction torque on the part of the engine, particularly at low start-up speeds, and prevents reliable starting. Especially in cold weather, this inherent mis-timing has disadvantageous results.

THE INVENTION

Briefly, the pole teeth of the rotor and of the stator pole disc have a triangular cross-section and the tips of each set of teeth are oriented towards the tips of the teeth of the other set. The rotor and/or the pole disc are made of material having low magnetic retentivity.

The ignition distributor for internal combustion engines according to the invention prevents the disadvantage discussed in connection with the prior art. As a result of the triangular embodiment of the pole teeth of the rotor and of the stator, a steeper inclination of the signal course is attained, and as a result thereof, a decreased inherent shifting of ignition is attained.

When the rotor and/or the pole disc are molded elements of sintered iron, a cost-favorable manufacture of the rotor and of the pole disc is attained. In addition, it is possible to fabricate nearly all of the tooth profiles which effect a more steeply inclined signal course. In known ignition distributors, the rotationally fixed connection of the coupler sheath/rotor is effected by means of a bolt which couples the two elements. This type of rotationally fixed connection is expensive in terms of both manufacture and assembly; this disadvantage is eliminated if the rotor has a slotted plate with a central hub and with teeth protruding from its rim and if an internal nose protrudes inwardly from the hub to engage a groove of the coupler sheath tube. If the coil body is of U-shaped radial cross-section with a larger flange oriented towards the rotor and a smaller one oriented towards the pole disc, then the space required for the pole teeth is made available in a simple manner.

DRAWING

One exemplary embodiment of the invention is illustrated in the drawing and described in further detail in the following description. Shown, in each case on an enlarged scale, are, FIG. 1, a detail of an ignition distributor in partial axial section;

FIG. 2, a pole disc in plan view;

FIG. 3, an axial section of the pole disc along the lines III—III in FIG. 2;

FIG. 4, the plan view on the rotor; and

FIG. 5, the rotor in axial section taken along the line V—V in FIG. 4.

DESCRIPTION OF THE ILLUSTRATED EMBODIMENT

Figure 1:
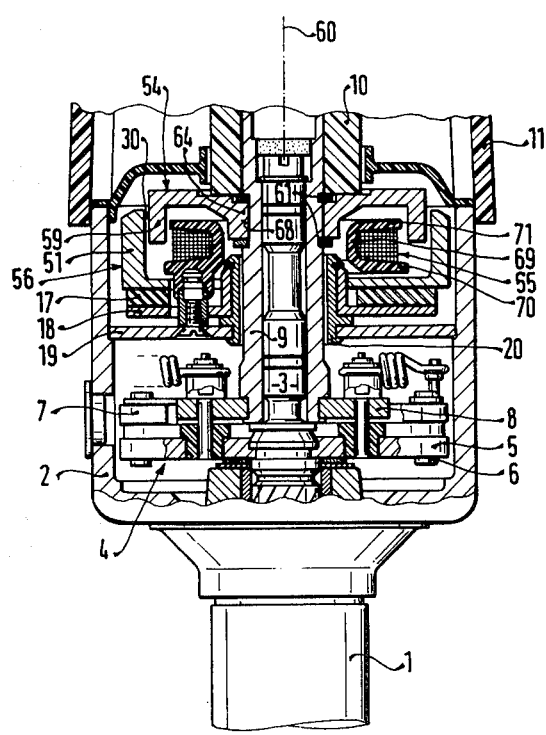

The ignition distributor in FIG. 1 has a distributor housing 2 with a shaft 1 and a distributor shaft 3 supported rotatably therein, which is driven by the camshaft of the internal combustion engine in a manner not shown. A centrifugal timing shift adjuster 4 is disposed in the lower portion of the housing 2. The centrifugal adjuster 4 comprises a flyweight carrier 5 secured on the shaft 3 and having two flyweights 7 disposed opposite one another and pivotable about bearing bolts 6, as well as a coupler 8 which is secured on a coupler sheath 9 supported on the shaft. A distributor rotor 10 is placed onto the upper end portion of the coupler sheath 9, and a distributor cap 11 closes the housing 2 at the top.

A control generator substantially comprises an annular coil 55, a rotor 54 and a stator, which is made up of a stator plate 18, a permanent magnet 17 and a pole disc 56. The annular coil 55 has a coil body 69, which is U-shaped in radial section and has a first flange 70 and a second flange 71. The diameter of the second flange 71 is smaller than that of the first flange. The rotor 54 and the pole disc 56 are each a single molded element, either of sintered iron or a mixture of sintered iron powder and carbonyl iron powder, with a binder of thermosetting resin.

The pole disc 56 is riveted to the stator plate 18, the permanent magnet 17 being disposed therebetween, to make a unit which is pivotable about a bearing sheath 20. The bearing sheath 20 is braced within a bearing plate 19 secured in the housing 2.

The one-piece pole disc 56 in FIGS. 2 and 3 substantially has an annular plate 52, with four pole teeth 51 offstanding from the outer rim thereof in one piece therewith, the pole teeth 51 being extended substantially parallel to the ignition distributor axis 60. The cross section of the pole tooth is triangular, with a triangular tip oriented toward the distributor axis 60. The annular plate 52 has a recess 67 and four rivet holes 65.

The one-piece rotor 54 in FIGS. 4 and 5 has a slotted plate 62, again with four pole teeth 59 offstanding from the outer rim thereof. The pole teeth 59 are extended approximately parallel to the axis 60 and have a triangular cross section, with the triangular tip pointing radially outward away from the axis 60. A hub 63 stands off from the inner rim of the slotted plate 62, and a nose 64 having a semicircular cross section is shaped on the inner face of this hub 63.

As shown in FIG. 1, two snap rings 61 secure the axial position of the rotor 54 on the coupler sheath 9, and the rotationally fixed connection of the two elements is effected by way of the nose 64 of the rotor 54 engaging a groove 68 of the coupler sheath 9. The rotor pole teeth 59 each having the outwardly directed triangular tip and the pole disc pole teeth 51 each having an inwardly directed triangular tip overlap in the axial direction. When two pole teeth are oppositely disposed, a working air gap 30 is formed.

We claim:

1. In an ignition distributor for internal combustion engines, a control generator having an annular coil (55), a rotor (54) and a stator which includes an annular permanent magnet (17), a stator plate (18) and a pole disc (56), said rotor (54) having a slotted annular plate portion on the inner rim of which a hub (63) is formed and pole teeth (59) extending axially from the outer rim of said plate portion which are made integrally with said plate portion and are of triangular cross-section in a radial plane, said stator pole disc (56) being riveted to said stator (18) with said permanent magnet disposed therebetween, and having an annular plate portion (52) and axially prolonged teeth (51) extending axially from the outer rim thereof which are made integrally with said annular plate portion (52) of said pole disc and are of triangular cross-section in a radial plane, said rotor pole teeth (59) and said stator pole teeth (51) partially overlapping each other and having their respective tips of triangular cross-section oriented towards each other and disposed for forming a working air gap in passing by each other, and at least one of said rotor (54) and said stator pole disc (56) being molded of sintered iron.

2. A control generator in an ignition distributor according to claim 1, in which at least one of said rotor (54) and said stator pole disc (56) is a part made of a sintered mixture of iron powder, carbonyl iron powder and a binder of thermosetting resin.

3. A control generator in an ignition distributor according to claim 1, in which a coil shell body (69) is provided for said annular coil (55), said coil shell body being U-shaped in its radial section and having a first flange (70) nearer said pole disc (56) and a second flange (71) nearer said rotor (54) which has an outer diameter smaller than that of said first flange.

* * * * *